(No Model.) 3 Sheets—Sheet 1.

J. P. TIRRELL & J. W. WILLARD.
COIN CONTROLLED VENDING MACHINE.

No. 523,385. Patented July 24, 1894.

WITNESSES
J. M. Hartnett
B. W. Williams

INVENTORS
Jacob P. Tirrell
John W. Willard
by their atty.
Henry W. Williams (No Model.) 3 Sheets—Sheet 2.

J. P. TIRRELL & J. W. WILLARD.
COIN CONTROLLED VENDING MACHINE.

No. 523,385. Patented July 24, 1894.

WITNESSES
J. M. Hartnett.
B. W. Williams.

INVENTORS
Jacob P. Tirrell
John W. Willard
by their atty.,
Henry W. Williams (No Model.) 3 Sheets—Sheet 3.

J. P. TIRRELL & J. W. WILLARD.
COIN CONTROLLED VENDING MACHINE.

No. 523,385. Patented July 24, 1894.

WITNESSES
J. M. Hartnett
B. W. Williams.

INVENTORS
Jacob P. Tirrell
John W. Willard
by their atty,
Henry Williams

THE NORRIS PETERS CO., PHOTO-LITHO., WASHINGTON, D. C.

UNITED STATES PATENT OFFICE.

JACOB P. TIRRELL, OF BOSTON, MASSACHUSETTS, AND JOHN W. WILLARD, OF PITTSFORD, VERMONT, ASSIGNORS, BY DIRECT AND MESNE ASSIGNMENTS, TO THE COLUMBIAN AUTOMATIC VENDING-MACHINE COMPANY, OF MAINE.

COIN-CONTROLLED VENDING-MACHINE.

SPECIFICATION forming part of Letters Patent No. 523,385, dated July 24, 1894.

Application filed July 15, 1893. Serial No. 480,623. (No model.)

*To all whom it may concern:*

Be it known that we, JACOB P. TIRRELL, of Boston, in the county of Suffolk and State of Massachusetts, and JOHN W. WILLARD, of Pittsford, in the county of Rutland and State of Vermont, citizens of the United States, have invented new and useful Improvements in Coin-Controlled Vending-Machines, of which the following is a specification.

This machine is intended particularly, but not necessarily exclusively, to automatically supply postage stamps to a purchaser upon the introduction of a coin, usually a five cent piece; and the invention consists in certain improvements fully described below and relating more particularly to the actuating and delivering mechanism whereby the operation of the machine is rendered more efficient and sure, and this type of machine generally improved.

The general style of this machine is illustrated in the United States Letters Patent granted July 19, 1892, to Virgil A. Krepps, numbered 479,005.

Figure 1:
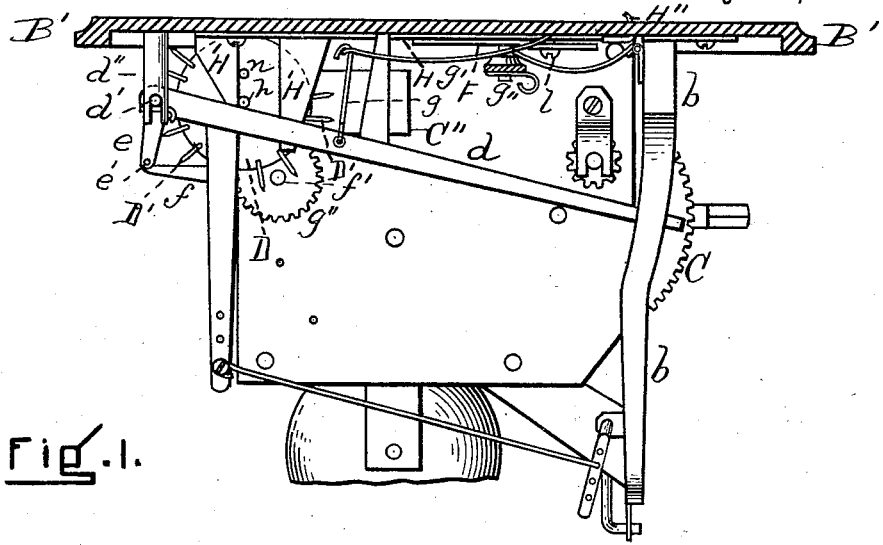
Figure 2:
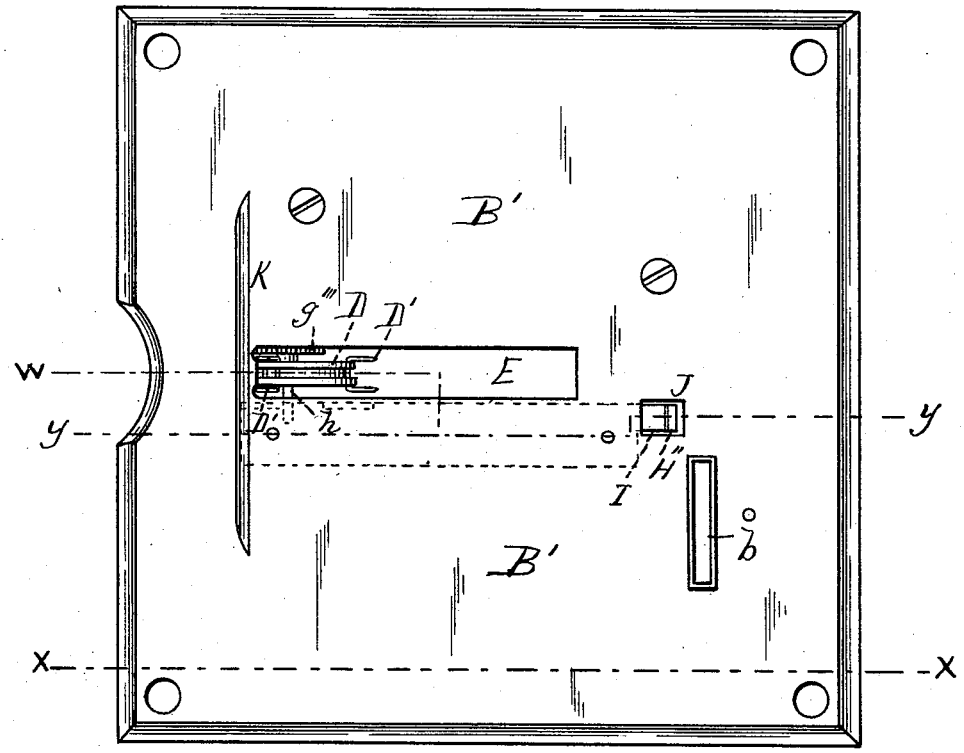
Figure 3:
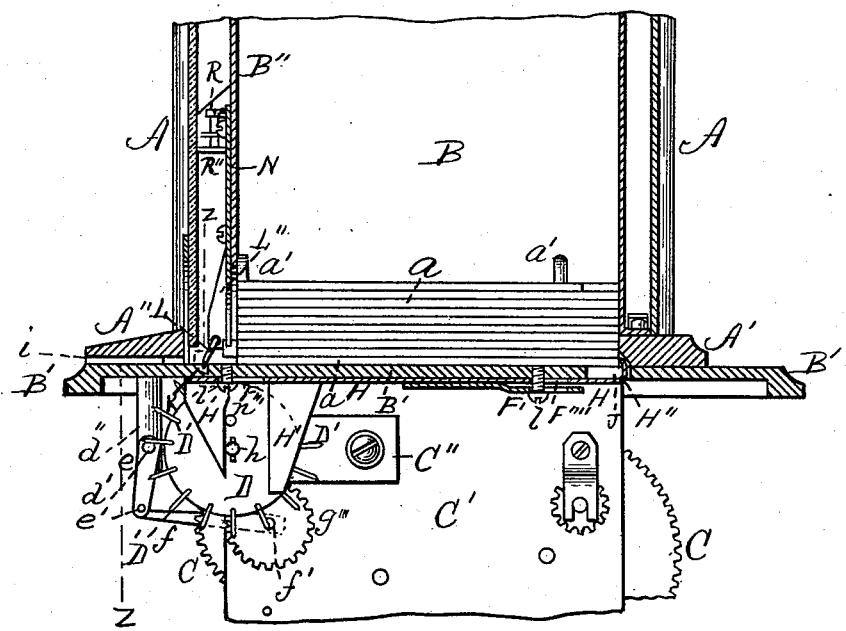
Figure 4:
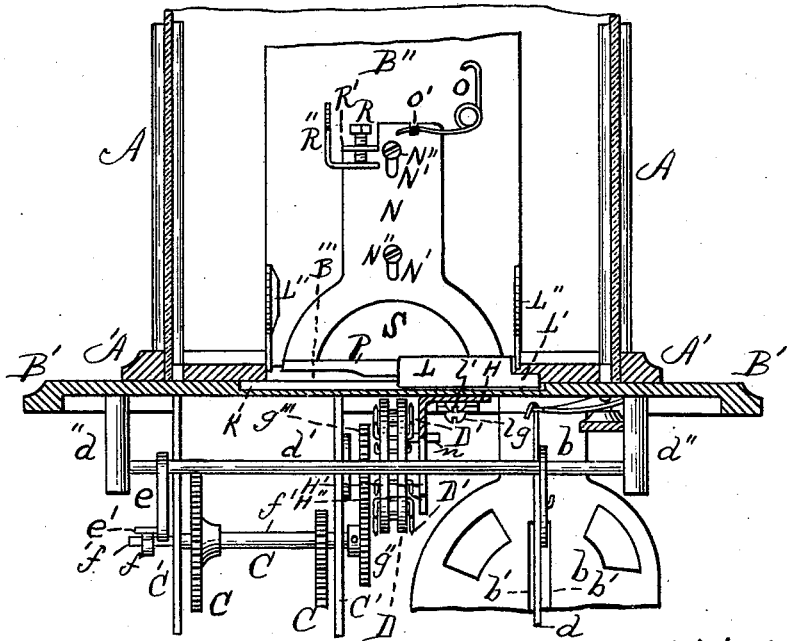
Figure 5:
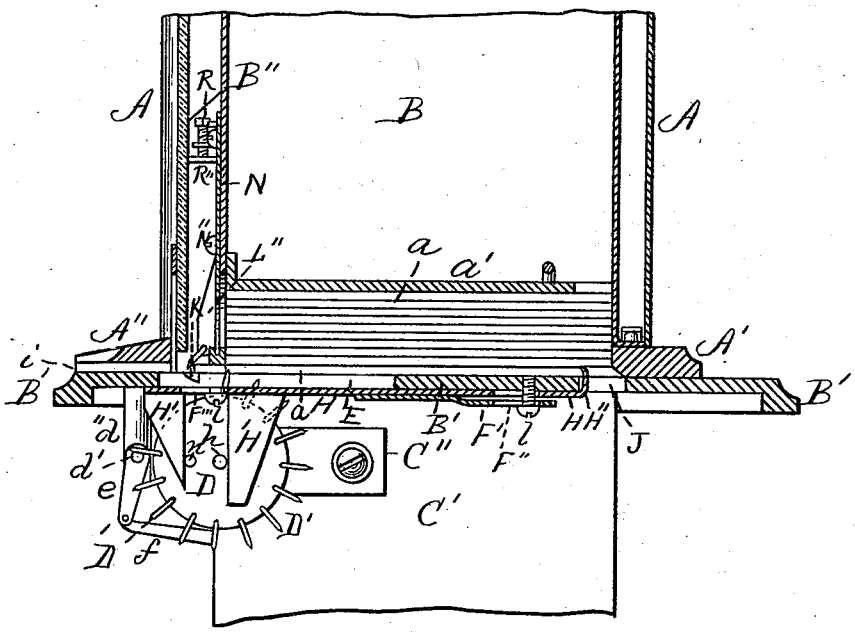
Figure 6:
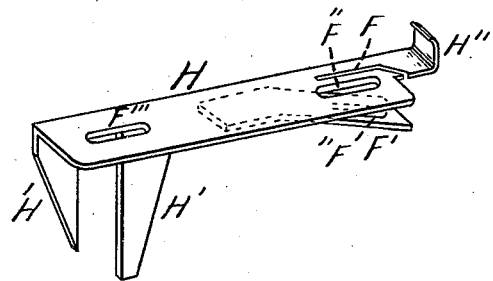

In the accompanying drawings, in which similar letters of reference indicate corresponding parts,—Figure 1 is a vertical section taken from front to rear, on line $x$—$x$, Fig. 2, showing the feeding and other mechanism in elevation. Fig. 2 is a plan view of the lower case, that is, the case containing the actuating and feeding mechanism. Fig. 3 is a section taken on line $y$—$y$, Fig. 2, through the top of the lower case and a portion of the upper case containing the commodity. Fig. 4 is a vertical section taken on line $z$—$z$, Fig. 3. Fig. 5 is a section taken on line $w$—$y$, Fig. 2. Fig. 6 is an enlarged perspective view of the delivering carrier.

A represents the walls of the upper case containing the commodity case B.

A' represents the base of the upper case, and B' represents the top of the lower case which contains the actuating mechanism.

$a$ represents a pile of envelopes containing, in this instance, postage stamps, and held down by a weight $a'$, all within the commodity case B.

$b$ (Figs. 1, 2, and 4) represents the chute extending down below the top plate B' into the lower case—whose sides are not shown—and provided with vertical slots $b'$ in which the outer end of the trip lever $d$ vibrates when struck by a descending coin. The opposite end of the trip lever $d$ is fast on the shaft $d'$ having bearings in the hangers $d''$ supported by the plate B'. Fast on this shaft is also a release lever $e$ engaging by means of a pin $e'$ with a detent $f$ fast on a shaft $f'$ extending from a spring actuated wheel train of ordinary construction, as C, supported by plates C'. The trip lever is connected by a hook $g$ with a spring $g'$, the pressure of which is regulated by a tension device $g''$ secured to the under side of the plate B'.

Thus far we have described nothing which we claim as new in this application.

The coin drops through the chute $b$ and strikes the end of the trip lever $d$ lying in the slot $b'$ and forces it down, partially rotating the shaft $d'$ and hence the release $e$ whose pin $e'$ frees the detent $f$ on the shaft $f'$ so that the train causes the detent to make one revolution before the spring $g'$ can pull the lever $d$ up again, when all resume their original positions ready to be operated by another coin. This operation, it is understood, is not new in this invention.

The shaft $f'$ has fast on it the gear wheel $g''$ which engages a similar gear wheel $g'''$ fast on the shaft $h$ supported by the bracket C'' secured to the plate C, (Figs. 1, 2, 3, and 5.) Fast on the same shaft $h$ is the delivering wheel D, preferably made double, as shown in Fig 4, and provided with radial spurs D' secured thereto near its periphery. A portion of the circumference however, is not provided with spurs, an arc being left plain. These spurs are intended to sweep through the slot E (Figs. 2 and 5) extending through the plate B', and aid in the delivery of the commodity through the passage $i$ under the projection A''.

H (Fig. 6) is a delivering carrier provided with downwardly projecting prongs or legs H' H' placed at and near, respectively, the forward end, as shown in Figs. 1, 3, 5 and 6. This carrier is provided with a slit F and the rear end is elongated and turned up into a lip H" which is rendered sufficiently yielding by said slit. The underside of the carrier is provided with a spring F', and the spring and carrier are provided with coincident slots F" and F"" whereby a screw l adjustably secures the carrier to the under side of the plate B', a similar screw, l' extending through the slot F"', and the lip H" extending up through a slot J in said plate. Figs. 2 and 5. The function of the spring F' is to secure the carrier with suitable tension to the plate to hold it in position when at rest. The prongs or legs H' extend down on opposite sides of a pin n on a face of the delivering wheel D.

The normal position of the device is illustrated in Figs. 1, 2, and 3. In these figures the plain arc of the delivery wheel D is uppermost or next the slot E and and the spurs D' are out of engagement with the lowest envelope a. The lip H" is at its rearmost point in the slot J and behind the envelope, and the pin e' rests on the detent f. When the lever e releases the detent by the action of a coin on the trip d, the detent makes one revolution with the shaft C, which causes the gears g" g"' to revolve once and hence the delivering wheel D to make one rotation. At the beginning of this rotation, the plain arc moves under the slot E and hence no spurs engage the envelope, but the pin n acts on the forward leg H' and slides forward the carrier H by means of the screws l and slots F" F"', the lip H" pushing forward the lowest envelope from the rear a distance corresponding with the length of the slots J, F" F"', into the position shown in Fig. 5, i.e., with its front edge in front of the front wall B" of the commodity case. When the envelope reaches this point, the delivery wheel has rotated sufficiently to bring one of its spurs into engagement with the under side of the envelope, and the rest of its rotation carries the envelope forward and leaves it projecting out through the space i ready to be removed by the purchaser. The latter part of the rotation of the delivery wheel brings the pin n into engagement with the rear leg H', and thus moves the carrier H back to its original position. The next envelope drops into the place of the first, and, in case the first is not removed, pushes it out before it. Thus it will be seen that the carrier H starts the envelope, and the wheel D completes the delivery.

The upper surface of the plate B' is provided with the groove or depression K extending parallel with and in front of the front wall B" of the commodity chamber,—see Figs. 2, 3, 4, and 5. This groove has its forward edge beveled or at an obtuse angle with the surface of the plate, and its rear edge substantially vertical. A gate L is pivotally suspended from brackets L" secured to the front side of the wall B", and hangs by gravity with its lower edge in the groove. It is obvious that the envelope during delivery will swing this gate up over the beveled forward edge of the groove. The gate cannot be swung back, and the groove prevents the insertion of a wire or knife or other instrument for purposes of thieving. In order to prevent persons from inserting a wire or other instrument around its ends, we provide wings L' at these points,—Fig. 4.

A vertical slide or presser plate, N,—see Figs. 3, 4 and 5,—is secured to the front side of the wall B" of the commodity chamber, by means of slots N' and screws N", said slide being provided at its lower edge with a presser foot P, preferably extending to a lower point in the center, as shown in Fig. 4. This device is for the purpose of pressing the advancing front edge of the envelope under the front wall of the commodity chamber through the space B"', so that it cannot catch and clog at that point. It is held down by a spring O secured to the wall B" and bearing on a lip O' on the presser plate, and the amount of pressure is regulated by a screw R moving in the threaded lip R' and bearing against the ledge R" secured to the wall B". An opening S is preferably provided through which the envelopes may be viewed from the outside.

By reason of the pressure of the spring O, the envelope during its delivery is held flexibly between the lower edge of the foot P and the spurs of the delivery wheel, and as the portion of the delivery wheel in engagement with the commodity is always an arc, and hence constantly pushing up on the envelope, this flexibility is a feature of importance.

Having thus fully described our invention, what we claim, and desire to secure by Letters Patent, is—

1. A coin controlled vending machine, comprising an automatically operating device adapted to start the delivery of the commodity by pushing it from the rear, and an automatically operating device which continues and completes the delivery of the commodity by engaging it on the under side, substantially as set forth.

2. In a coin-controlled vending machine, the combination with a round delivery wheel adapted to engage the commodity from the under side and having its periphery divided into two sections or arcs, viz., a plain arc or section and an arc or section provided with numerous radial spurs, the said two arcs or sections comprising the entire periphery, and a cooperating presser mechanism, of means for feeding the front end of the article to be delivered between these parts while the plain arc is uppermost, whereby the arc provided with spurs may engage the commodity after it has been started under the presser mechanism substantially as described.

3. In a coin controlled vending machine, a round delivery wheel located under the presser plate and beneath the forward end of the commodity and adapted to engage the commodity from the under side and having its periphery divided into two sections or arcs, viz., a plain section or arc and a section or arc provided with numerous radial spurs, the said two arcs or sections comprising the entire periphery, combined with cooperating mechanism for forcing the forward end of the article to be delivered under the presser plate when the plain arc is opposite thereto, whereby the arc provided with spurs may engage the commodity after it has been started under the said presser plate, substantially as described.

4. In a coin controlled vending machine, in combination, starting mechanism which directly engages the rear face of the article to be delivered and pushes it from the rear, and mechanism for continuing and completing the delivery by engaging its longitudinal surface, substantially as set forth.

5. In a coin controlled vending machine, in combination, the sliding delivering carrier H moving horizontally in the plate B', and the rotating delivery wheel D having a portion of its periphery provided with radial spurs, D', and a portion of the periphery being plain, said carrier automatically starting the delivery of the commodity and said wheel continuing and completing it, substantially as described.

6. In combination, the carrier H provided with the legs H' and sliding in the plate A', and the wheel D provided on a portion only of its periphery with engaging spurs, and on its face with the pin $n$ extending between and adapted to be alternately in engagement with said legs, substantially as set forth.

7. The delivery carrier consisting essentially of the main portion provided at one end with the downwardly extending legs H', at the other end with the upturned spring lip H'' and the slot F'', and on the under side with the spring F' provided with the slot F'''', substantially as set forth.

8. In a coin controlled vending machine, the plate B provided with the slots E and J, the delivery wheel engaging the commodity through the slot E, and the sliding delivering carrier engaging the commodity through the slot J, the delivery being produced by the consecutive efforts of said wheel and carrier, substantially as described.

9. In a coin controlled vending machine the plate B' having a flat horizontal surface provided with the groove K crossing the path of the delivery of the commodity, said groove having its rear edge vertical and its front edge beveled at an obtuse angle with the plate, and a gate hung with its lower edge within the groove and below the surface of the plate, substantially as described.

10. The gate L hung across the path of delivery of the commodity and provided with integral rigid end wings or extensions L', whereby a wire or other instrument is prevented from being inserted at or by the ends, substantially as set forth.

11. In a coin controlled vending machine, the yielding presser plate N held normally down by a spring and provided with a foot P for pressing on the front edge of the commodity, whereby jamming is prevented at that point and space enough for one envelope provided, substantially as described.

12. The presser plate N provided at its base with the foot P and the lips O' R' near the top edge, in combination with the front wall B'' of the commodity receptacle provided with the spring O engaging with the lip O', and the screw R and ledge R'', said screw engaging the lip R' and bearing against said ledge, substantially as set forth.

JACOB P. TIRRELL.
JOHN W. WILLARD.

Witnesses:
HENRY W. WILLIAMS,
J. M. HARTNETT.